United States Patent [19]

Kobayashi et al.

[11] 4,335,293
[45] Jun. 15, 1982

[54] HEATING CONTROL APPARATUS BY HUMIDITY DETECTION

[75] Inventors: Tetsu Kobayashi; Takato Kanazawa, both of Nara; Makoto Tsuboi, Yamatokoriyama, all of Japan

[73] Assignee: Matsushita Electric Industrial Co., Ltd., Osaka, Japan

[21] Appl. No.: 157,171

[22] Filed: Jun. 6, 1980

Related U.S. Application Data

[63] Continuation of Ser. No. 768,191, Feb. 14, 1977, abandoned.

[30] Foreign Application Priority Data

Feb. 17, 1976 [JP] Japan .................................. 51-16737
Feb. 20, 1976 [JP] Japan .................................. 51-18116
Sep. 25, 1976 [JP] Japan .................................. 51-115288

[51] Int. Cl.³ .............................................. H05B 6/68
[52] U.S. Cl. ....................... 219/10.55 B; 219/10.55 R; 340/588
[58] Field of Search .................. 219/10.55 B, 10.55 C, 219/10.55 R, 413, 414, 441; 340/588, 584; 73/99

[56] References Cited

U.S. PATENT DOCUMENTS

| | | | |
|---|---|---|---|
| 3,467,804 | 9/1969 | Smith | 219/10.55 B |
| 3,813,918 | 6/1974 | Moe | 219/10.55 R X |
| 3,839,616 | 10/1974 | Risman | 219/10.55 R |
| 3,909,598 | 9/1978 | Collins et al. | 219/10.55 R |
| 4,035,787 | 7/1977 | Hornung | 219/10.55 B X |
| 4,097,707 | 6/1978 | Kobayashi et al. | 219/10.55 B |
| 4,133,995 | 1/1979 | Buck | 219/10.55 B |

Primary Examiner—Arthur T. Grimley
Attorney, Agent, or Firm—Spencer & Kaye

[57] ABSTRACT

A heating control apparatus in microwave ovens controls heating of food by detecting water vapor generated by heating a food to sense a varying relative humidity by a humidity sensor and determining a critical point of the heating condition of the food by detecting a time point when the relative humidity rises from a minimum value beyond a predetermined threshold value thereby to determine a proper total heating time of the food. To allow accurate humidity sensing, a cleaning device is provided in proximity to the humidity sensor such that the cleaning device is actuated for an appropriate time period at a proper timing to insure proper performance of the humidity sensor.

11 Claims, 14 Drawing Figures

F I G. 1
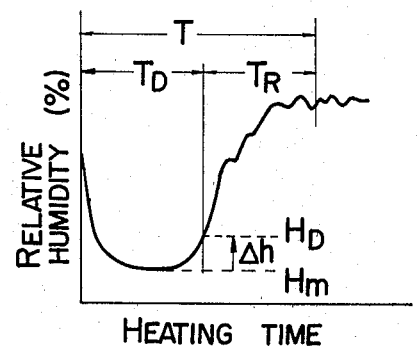
F I G. 2
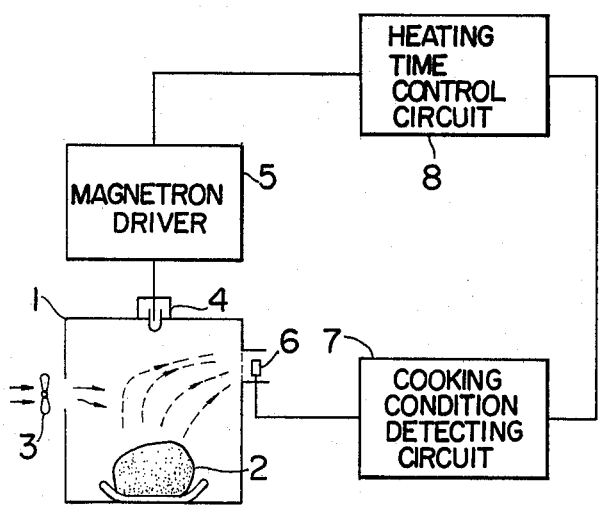

F I G. 5
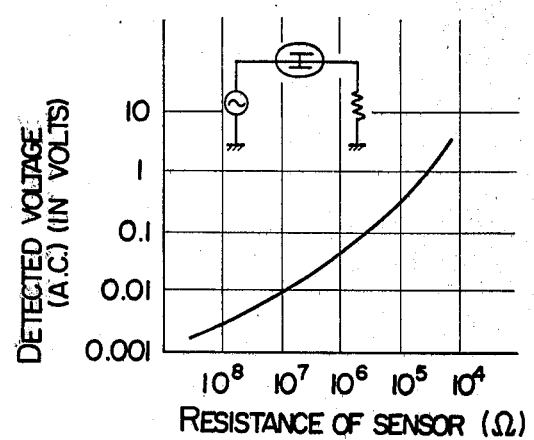
F I G. 6
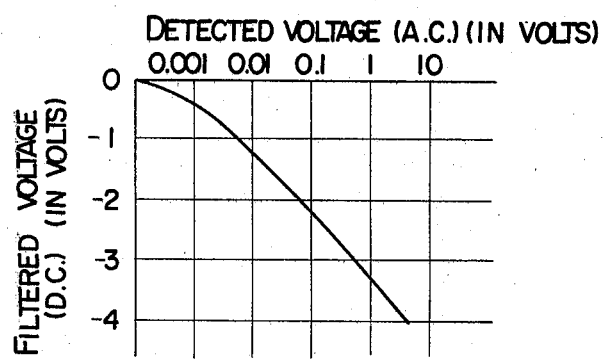

HEATING CONTROL APPARATUS BY HUMIDITY DETECTION

This is a continuation of application Ser. No. 768,191 filed Feb. 14, 1977, now abandoned.

The present invention relates to an apparatus for automatically controlling a heating time of a food to be heated depending on the type and quantity of food in a heating and cooking apparatus, typically a microwave oven.

In microwave heating, an optimum heating time of a food is determined by various factors such as an initial temperature of the food, the quantity of the food, final target temperature of the food, a specific heat of the food and a power supplied to a microwave device.

In the past, the heating time in the microwave oven has been established by setting a timer to a standard heating time which was experimentarily determined in accordance with the type and quantity of the food.

Such a method of establishing the heating time of the food included a disadvantage of difficulty in obtaining an accurate heating and cooking because the method did not take into consideration the above factors for determining the heating time, that is, the initial temperature, the final target temperature, the specific heat and the power supplied to the microwave device.

The disadvantage of the prior art method is due to the fact that a major factor determining a finished condition of the food is not the heating time but a temperature rise of the food itself.

Thus, if the temperature rise of the food being heated can be detected by any means, the disadvantage described above could be overcome and ideal heating and cooking could be achieved.

To detect the temperature rise of the food, a temperature sensor may be inserted directly into the food or a non-contact type temperature sensor may be used. However, the use of those methods is restricted because, in the former method, the temperature sensor directly contacts with the food, and in the former method, an exact temperature can not always be sensed.

On the other hand, it is possible to detect the temperature or the heating condition of the food by measuring a humidity change caused by heating the food. For example, in many types of food, when the temperature of the food reaches near 100° C., water contained in the food is suddenly evaporated and a large quantity of water vapor is generated in an oven. Namely, as the food is heated, a relative humidity near the food changes.

Thus, by detecting the humidity change by a humidity sensor, it is possible to relate a time when the abrupt change of humidity occurs to a time at which the temperature of the food reached near 100° C. The abrupt rise of the humidity can be determined by detecting that the humidity has exceeded a predetermined threshold. However, the humidity sensor normally senses the relative humidity, and the relative humidity prior to heating also changes depending on a surrounding temperature and a surrounding humidity. Accordingly, when a fixed relative humidity value is established as the humidity threshold, the field of application of the method using such humidity detection is restricted.

Furthermore, where the humidity sensor is used in the above environment, a surface of the sensor is contaminated by water vapor generated during heating as well as by smoke and organic dust from the food so that a sensitivity of the sensor to the humidity decreases.

The present invention is directed to an apparatus which overcomes the above problems and automatically heating and cooking food using a relation between a temperature of the food and a humidity.

A method for detecting a humidity of a food to control a power supplied to a magnetron is disclosed in U.S. Pat. No. 3,839,616. The purpose of the patent, however, is to prevent overheating and a humidity sensor is used therein as a means for effecting cyclic heating of the food in an intermittent fashion. Thus, unlike the present invention the object of the patent is not to attain automatic heating and cooking.

It is an object of the present invention to eliminate the need for correction of heating time depending on the amount of food, an initial temperature of the food, an efficiency of a heating source such as a magnetron or a variation in absorption factor of the food for a microwave energy, and to eliminate a setting operation in a heating oven such as a microwave oven.

It is another object of the present invention to allow the detection of heating condition without requiring direct contact to the food to be heated.

It is still another object of the present invention to allow the detection of humidity change caused by heating without being affected by environment temperature and humidity changes.

It is another object of the present invention to provide a means for preventing the reduction of sensitivity to humidity of a humidity sensor due to contamination deposited on a surface thereof.

FIG. 1 is a graph showing the change of humidity created as a food is heated.

FIG. 2 shows a block diagram illustrating a basic principle of the present invention.

FIG. 5 shows a relation between a resistance of the sensor and a detection voltage thereof.

FIG. 6 shows a relation between the detection voltage and a filtered output voltage.

Figure 3:
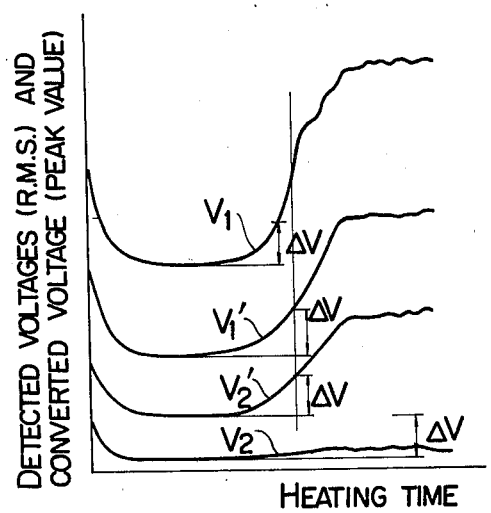
FIG. 3 shows a graph illustrating the changes of humidity for different surrounding temperatures of a humidity sensor.

The present invention relates to an apparatus for detecting a cooking condition of a food in a cooking oven such as a microwave oven to automatically determining a heating time of the food.

In the microwave oven, for example, the heating time of the food is determined by various factors such as an initial temperature of the food to be heated, the quantity thereof, a final target temperature thereof, a specific heat thereof and an energy absorbed by microwave.

Heretofore, the heating time of the microwave oven has been established by a time determined by the type of food to be heated and the quantity thereof. A relation between the type of food and the heating time therefor has been predetermined based on an experiment of heating. Accordingly, for any type of food, the heating time therefor cannot be established without considering information on the quantity of the food. Furthermore, of the factors which contribute to the determination of the heating time, the specific heat of the food, the initial temperature thereof and the final target temperature thereof have not been considered in the prior art method of establishing the heating time. Therefore, the prior art method includes a drawback of high possibility of miscooking and misheating.

The present invention overcomes the problems encountered in the prior art method of establishing the heating time and provides a means for attaining a cooking oven which is easy to manipulate. The preferred embodiments of the present invention will not be described.

As shown in FIG. 1, where a food is heated within an oven, a relative humidity in the oven initially decreases with the rise of temperature because the quantity of water vapor generated from the food is small. As the quantity of water vapor increases, the relative humidity becomes minimum and thereafter increases and finally increases with a sharp gradient. The time at which the relative humidity rises from the minimum point by a given amount $\Delta h$ of relative humidity is near the time at which the food has reached a given temperature (near 100° C.) and at which a remarkable change in the cooking condition of the food takes place. The temperature at that moment has little connection with a temperature of the food prior to heating thereof (hereinafter referred to initial temperature of the food) and the quantity of the food.

The time at which the relative humidity starts to rise with sharp gradient and rises by the amount $\Delta h$ from the minimum point is near the time at which most of the foods reach an appropriate temperature in case of reheating of the foods. Accordingly, for those foods, a proper heating in attained by setting the heating time to a time period to beginning at the start of heating and ending at the above time. For the foods to be cooked, they may be further heated after the occurrence of the sharp gradient of the relative humidity curve for a time period determined by the type and the quantity of the food to be cooked.

Since the time period ending at the occurrence of the sharp gradient in the relative humidity curve already includes the influence by the quantity of the food and the initial temperature thereof, those factors need not be further considered. In general, a proper heating time T for a food can be given by;

$$T = T_D + T_R \tag{1}$$

where $T_D$ is the time period from the start of heating of the food to a time at which the relative humidity rises from the minimum humidity value $H_m$ by the increment $\Delta h$ to a humidity value $H_D$ through the sharp change of humidity, and $T_R$ is the time period following to the time period $T_D$, which is determined by the quantity and the type of the food. Since the time period $T_R$ is determined by $T_D$ and the type of the food, it is given by;

$$T_R = kT_D \tag{2}$$

where k is the constant which is inherent to the particular food. From the equations (1) and (2);

$$T = T_D + kT_D = (1+k) T_D \tag{3}$$

Thus, an optimum total cooking time can be determined by measuring the time period $T_D$ ending at the time at which the humidity rises from the minimum humidity value $H_m$ by the increment $\Delta h$ through the sharp change of humidity and calculating a sum of $T_D$ and the time period which is a product of $T_D$ and the constant k determined by the type of food or cooking.

An apparatus of calculating such a heating time is now explained in conjunction with an embodiment of the present invention.

Referring to FIG. 2, numeral 1 denotes an oven body of a microwave oven, 2 a food to be heated, 3 a blower type fan, 4 a magnetron, 5 a magnetron driver, 6 a humidity sensor, 7 a cooking condition detecting circuit, and 8 a heating time control circuit. FIG. 2 shows a principal construction of the present apparatus. The humidity sensor 6 may be formed by ceramic composition consisting of 1-99 mole % of $ACr_2O_4$ component (where A is an element selected from a group consisting of Mg, Fe, Ni, Co, Mn and Cu) and 99-1 mole % of $TiO_2$ component, although the present invention is not limited to the particular composition shown above.

The operation of the apparatus of FIG. 2 is explained below. The humidity sensor 6 senses a relative humidity which changes with water vapor generated from the food 2 which is heated by the magnetron 4. The cooking condition detecting circuit 7 receives a sensed signal from the humidity sensor 6 to detect when the relative humidity has risen from the minimum value by the small amount $\Delta h$. The heating time control circuit 8 responses to the detected signal for determining an optimum heating time and controlling the magnetron driver 5 to activate or deactivate the magnetron 4.

The relative humidity in the exhaust port considerably changes with a surrounding temperature. Since the resistance of the humidity sensor 6 changes as a logarithmic function of the humidity (see FIG. 4), the detected voltage varies over several orders depending on the temperature in the exhaust port (see FIG. 5), and the increment $\Delta V$ of the detected voltage from the minimum value varies considerably depending on the sensor that is, whether it is summer or winter, and the geographical area at which the apparatus is used, that is, whether it is warm area or cool area. Namely, the detected voltage curve $V_1$ shown in FIG. 3 was taken for a relatively low exhaust port temperature, in which case the level of the detected voltage $V_1$ is generally high and the increment $\Delta V$ from the minimum value is relatively large, while the detected voltage curve $V_2$ was taken for a relatively high exhaust port temperature, in which case the level of the detected voltage $V_2$ is very low and the increment from the minimum value is also small. Furthermore, the time period required for the detected voltage to increase from the minimum voltage by a given voltage increment (which corresponds to the relative humidity increment $\Delta h$) is short for the detected voltage curve $V_1$ while it is long for the detected voltage curve $V_2$ or the voltage curve $V_2$ may not rise by such voltage increment.

Figure 4:
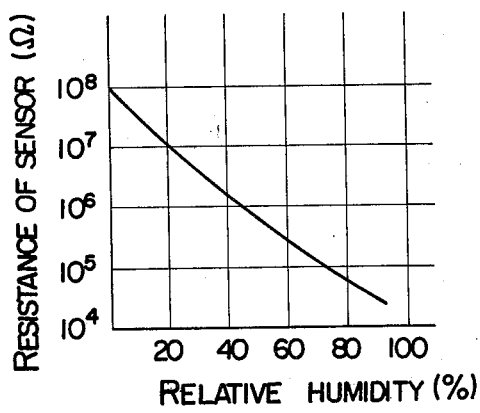
FIG. 4 shows a characteristic curve of the humidity sensor.

In the present invention, a method is adopted by which, for a given food to be heated, the time required for the detected voltage to rise by the given voltage increment varies only slightly even under a wide exhaust port condition in which a large temperature difference may exist. Namely, as shown in FIG. 3, the detected voltage $V_1$ is logarithmically amplified to produce a converted voltage curve $V_1'$ and the detected voltage $V_2$ is logarithmically amplified to produce a converted voltage curve $V_2'$ so that both converted voltage curves require substantially same time period to rise by the given voltage increment $\Delta V$ from the minimum value.

A means for obtaining a proper heating time from the converted voltage is now explained with reference to FIGS. 7 to 9 which illustrate an embodiment of the present invention.

Figure 7:
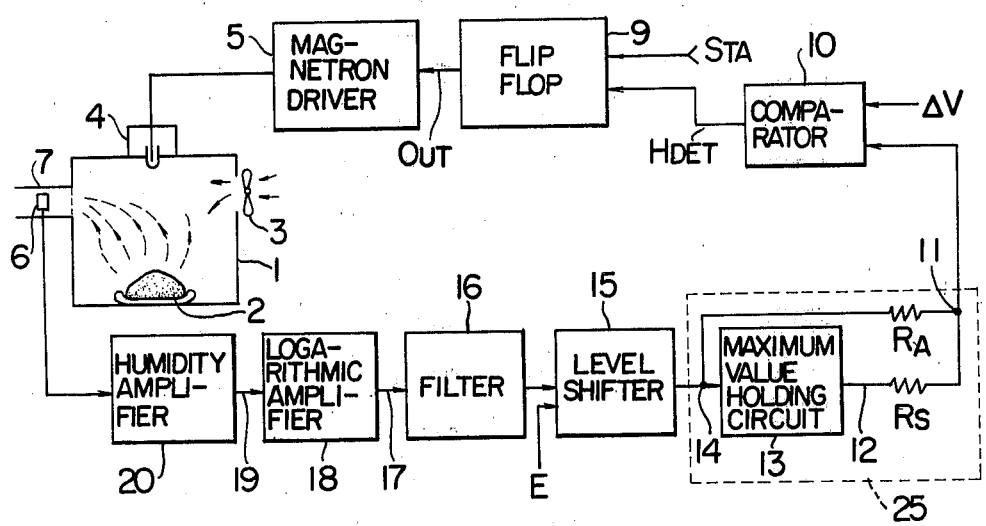
FIG. 7 is a block diagram of one embodiment of the present invention.
Figure 8:
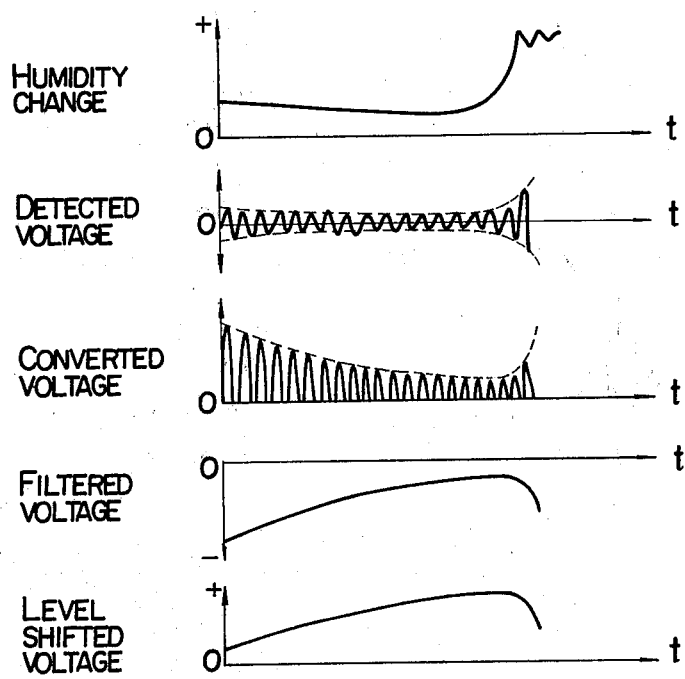
FIG. 8 illustrates waveforms for explaining the operation of FIG. 7.

In FIG. 7, numeral 1 denotes an oven body of the microwave oven, 2 a food to be heated, 3 a blower type fan, 4 a magnetron, 5 a magnetron driver, 6 a humidity sensor disposed within an exhaust port 7. Numeral 20 denotes a humidity amplifier which amplifies a humidity signal detected by the humidity sensor 6 to produce a detection voltage at an output terminal 19 thereof.

Numeral 18 denotes a logarithmic amplifier which logarithmically amplifies the detected voltage and at the same time rectifies the same such that it logarithmically amplifies only positive half cycle portions of the detected voltage to produce the converted output at an output terminal 17. Numeral 16 denotes a filter circuit which filters the converted voltage and inverts it to produce a smoothened voltage. Numeral 15 denotes a level shifting circuit which adds a voltage E to converts the negative voltage to a positive voltage. The waveforms of the detected voltage, converted voltage, filtered voltage and level shifted voltage are shown in FIG. 8. Numeral 25 in FIG. 7 denotes a maximum value detection circuit which comprises a maximum value holding circuit 13 and resistors $R_A$ and $R_S$ having respective one ends connected to an input terminal 14 and an output terminal 12 of the maximum value holding circuit 13 and respective the other ends connected together to an output terminal 11 of the maximum value detection circuit 25. Numeral 10 denotes a comparator which compares an output from the maximum value detection circuit 25 with the reference level $\Delta V$ and produce an output signal HDET when the former exceeds the latter. Numeral 9 denotes a flip-flop circuit an output signal OUT of which controls the magnetron driver 5 which, in turn, drives the magnetron 4.

Figure 9:
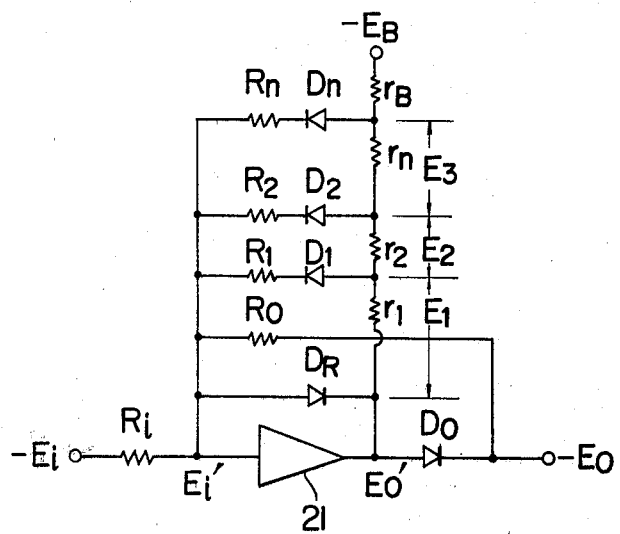
FIG. 9 shows a logarithmic conversion circuit.

FIG. 9 shows a particular circuit of the logarithmic amplifier 18 shown in FIG. 7. An input resistor $R_i$ is connected to an input of an inverting high gain amplifier 21, and series connections of feedback resistors and feedback diodes, $R_o$-$D_o$, $R_1$-$D_1$, $R_2$-$D_2$, ... $R_n$-$D_n$, are connected in parallel with each other in a feedback loop. Biasing resistors $\gamma_1, \gamma_2, \ldots \gamma_n, \gamma_B$ are connected between respective adjacent series connections and a bias voltage supply $E_p$ is connected to the resistor $\gamma_B$ to produce bias voltages across respective biasing resistors. An input voltage $E_i$ is applied to an input terminal of the logarithmic amplifier and an output voltage $E_o$ is produced at an output terminal thereof. An input voltage $E_1'$ is applied to the input terminal of the amplifier 21 while an output voltage $E_o'$ is produced at an output terminal thereof.

Figure 10:
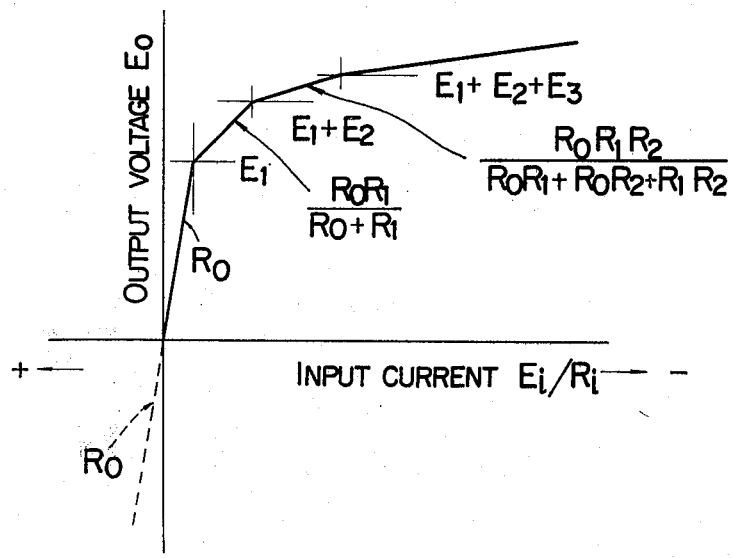
FIG. 10 shows a characteristic curve of the circuit of FIG. 9 to explain the operation thereof.

A solid line in FIG. 10 shows a characteristic of the logarithmic amplifier of FIG. 9 illustrating a relation between an input current $E_i/R_i$ and the output voltage $E_o$.

In FIG. 9, if the magnitudes of the resistors $\gamma_1, \gamma_2, \ldots \gamma_n$ are sufficiently low to compare with those of the resistors $R_o, R_1, R_2, \ldots R_n$, the voltages $E_1, E_2, E_3$ across the resistors $\gamma_1, \gamma_2, \ldots \gamma_n$ are maintained substantially constant. Accordingly, as the magnitude of the output voltage $E_o$ increases, the diodes $D_1, D_2, \ldots D_n$ become conductive in this order and the output voltage characteristic for the increase of the input voltage $E_i$ shows a logarithmic segmental curve as shown in FIG. 10. Namely, when $E_o < E_1$, $$E_0 = E_i \frac{R_0}{R_1},$$

when $E_1 \leq E_0 < E_1 + E_2$, $$E_0 = E_1 + \frac{R_0 R_1}{R_0 + R_1} \left( \frac{E_i}{R_i} - \frac{E_1}{R_0} \right), \text{ and}$$

when $E_1 + E_2 \leq E_0 < E_1 + E_2 + E_3$, $$E_0 = E_1 + E_2 + \frac{R_0 R_1 R_2}{R_0 R_1 + R_0 R_2 + R_1 R_2}$$

$$\left( \frac{E_i}{R_i} - \frac{E_1}{R_0} - \frac{E_2}{\frac{R_0 R_1}{R_0 + R_1}} \right)$$

Diodes $D_R$ and $D_o$ serve to suppress a positive input voltage to maintain a linear negative input rectifying characteristic.

Figure 11:
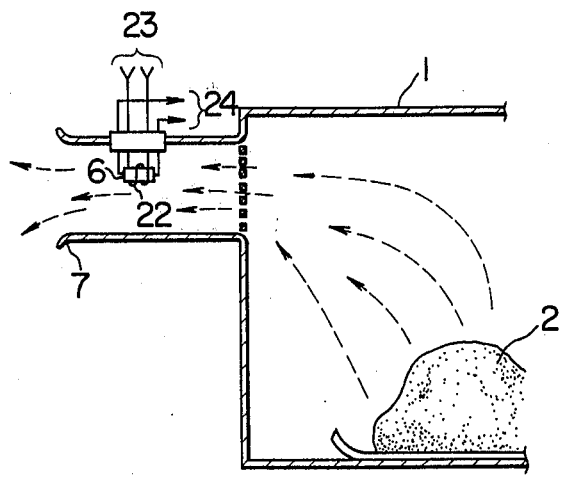
FIG. 11 shows a humidity sensor with a cleaning heater together with the arrangement thereof.

The resistance of the humidity sensor usually changes depending on the presence or absence of deposition of water vapor particles on the surface thereof. Accordingly, if the sensor surface is contaminated, the sensitivity of the sensor decreases. When the sensor is used in the microwave oven, it is unavoidable that evaporated material such as oil or soy source deposits on the sensor. Accordingly, it is necessary to remove such contaminant from the surface of the sensor. One of effective means to remove the contaminant is to burn it out. As shown in FIG. 11, a heater 22 is wound around the sensor 6 and the heater 22 is powered to radiate heat to heat the surface of the sensor for burning the contaminant deposited on the surface of the heater.

Figure 12:
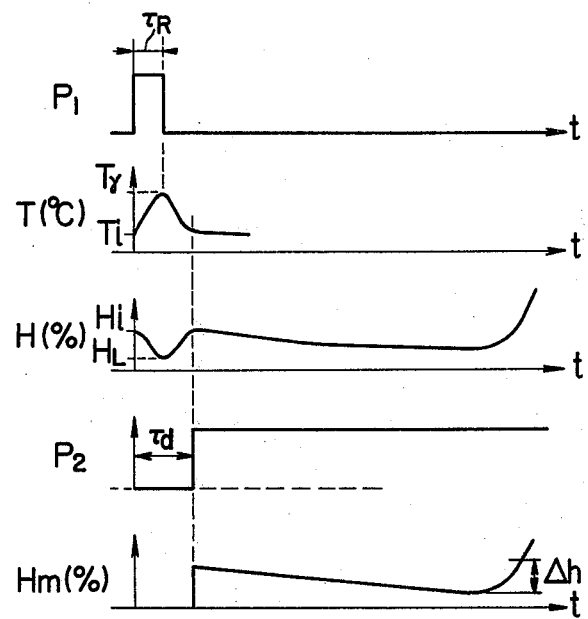
FIG. 12 illustrates a cleaning sequence.

FIG. 12 illustrates a principle of cleaning control in heating the food in the microwave oven. $P_1$ designates a pulse signal defining a time period during which a current is supplied to the heater 22 for cleaning. The current flows for the time period $\tau_R$. T shows temperature rise on the surface of the sensor after the heater has been energized for the time period $\tau_R$. A net temperature rise is $(T_\gamma - T_i)$ (°C.) where $T_i$ (°C.) is the initial temperature. H denotes relative humidity change detected by the sensor. By the temperature rise of $(T_\gamma - T_i)$ (°C.), the relative humidity at the surface of the sensor decreases from an initial humidity $H_i$ to $H_L$.

The above phenomenon recovers as the heater current is terminated after the elapse of the time period $\tau_R$ and the temperature of the sensor restores to a room temperature. The recovery time is $\tau_d$ shown in column $P_2$. The pulse $P_2$ having the duration $\tau_d$ controls the input signal to the humidity detection circuit such that it is applied to the humidity detection circuit $\tau_d$ time after the start of heating, as shown by column $H_m$.

Figure 13:
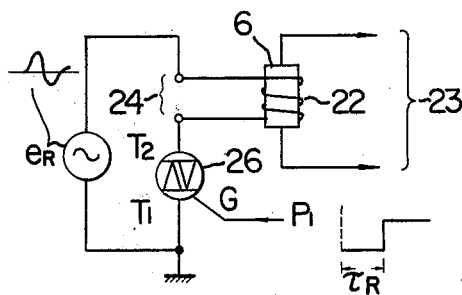
FIG. 13 shows one embodiment of a control circuit for the cleaning heater.

FIG. 13 shows a principle of a circuit for cleaning the heater. Numeral 26 denotes a TRIAC (or Bidirectional Triode Thyristor). The heater 22 as a load is energized only for the time period $\tau_R$ by the pulse $P_1$ which controls a gate G of the TRIAC 26. Symbol $e_R$ denotes a heating power supply which may be a D.C. supply or a commercial power supply of 50/60 Hz. Power capacity thereof is determined by a specification of the heater. Power control for the heater to supply power for necessary cleaning operation may be carried out by any other method such as a phase control system.

Figure 14:
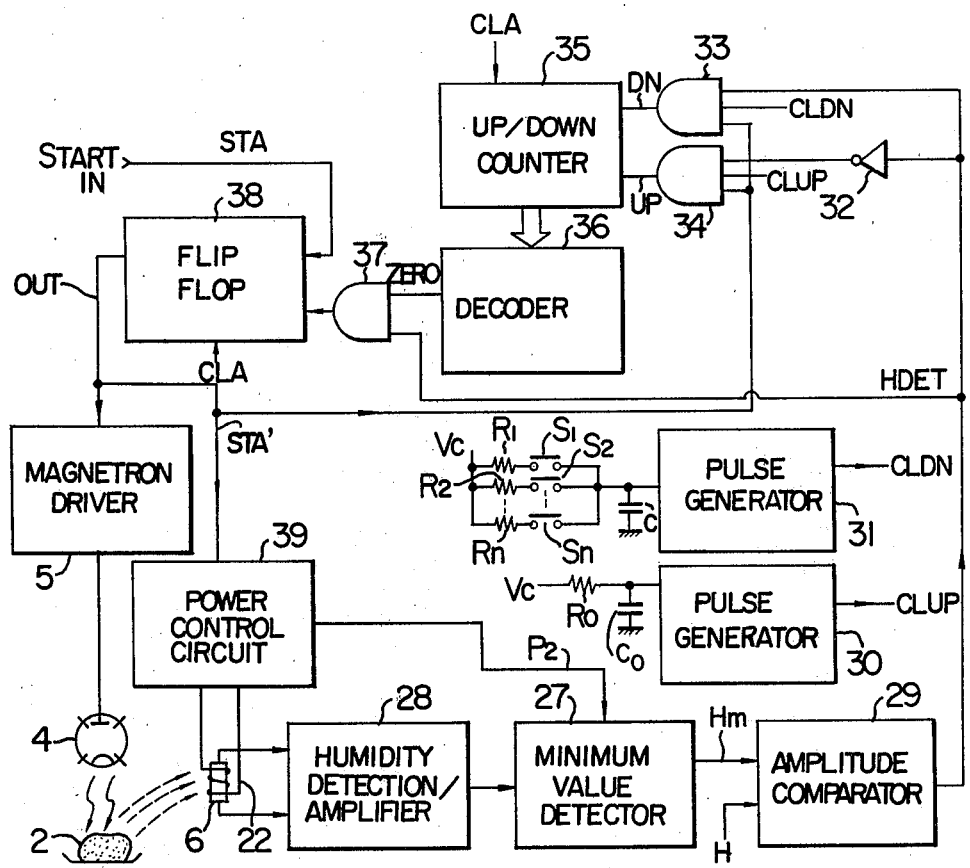
FIG. 14 shows another embodiment of the present invention.

FIG. 14 shows an embodiment of a control unit for attaining automatic heating and cooking by the microwave oven in accordance with the present invention. It attains automatic heating in accordance with equation (3) above.

In FIG. 14, numeral 32 denotes an inverter gate, and 33, 34 denote three-input gates, respective outputs of which are applied to count inputs of an up/down counter circuit 35.

The up/down counter 35 carries out count-up operation in response to the output signal UP from the gate circuit 34 and carries out count-down operation in response to the output signal DN from the gate circuit 33. The content of the counter 35 is cleared by a signal CLA. The counter 35 is constructed as a binary counter with each bit state being indicated. Numeral 36 denotes a decoder which receives the respective bit outputs of the counter 35 and produces "1" output on output line 2ERO when the bit outputs from the counter 35 are all "0". Numeral 37 denotes a two-input gate circuit which produces "1" output when the signal on the line HDET and the signal on the line ZERO and both "1". Numeral 38 denotes a flip-flop circuit which is set to "1" by a start signal on a line STA and reset to "0" by the output of the gate circuit 37. The output of the flip-flop 38 is applied to a drive circuit 5 for a magnetron 4. The output of the flip-flop 38 is cleared to "0" by the signal CLA. Numerals 30 and 31 denote pulse generator circuits, oscillation frequencies of which are charged by the magnitudes of resistors and capacitors. They may be astable multivibrators. Switches $S_1, S_2, \ldots S_n$ connected to the pulse generator 31 are food group selection switches by which the constant k determined by the particular food to be cooked as described above is related to one of resistors $R_1, R_2, \ldots R_n$ so that the pulse generator 31 changes its oscillation frequency accordingly. On the other hand, the pulse generator 30 has constant resistor $R_o$ and constant capacitor $C_o$ coupled thereto so that the oscillation frequency thereof is fixed.

When the counter 35 counts n clock pulses in the time period $T_D$ (sec), then $T_D$ is given by;

$$T_D = \tau n \text{ (sec)} \quad (4)$$

where $\tau$ is the period of the clock signal. Since $T_R = kT_D$ as shown in equation (2), $T_R$ can be expressed by;

$$T_R = k\tau n \text{ (sec)} \quad (5)$$

The up/down counter 35 is used to count the number n in the count-up mode during the time period $T_D$ while in the count-down mode during the time period $T_R$. The circuit is arranged such that the time when the content of the counter becomes zero in the count-down mode corresponds to $T = T_D + T_R$. Thus, the total heating time T can be counted by the single up/down counter 35. To this end, the period of the clock signal must be changed between the count-up mode and the count-down mode. This is apparent from equation (5) which shows that the period of the clock signal in the count-down mode should be k times as long as the period of the clock signal in the count-up mode. The period of the clock signal can be changed by changing the circuit constant which determines the frequency of the clock signal generating circuit, such as capacitor C or resistor R. That is, the circuit constant C or R may be related to the constant k inherent to the particular food to be cooked. In FIG. 14, the pulse generator 30 generates the clock signal CLUP at a fixed frequency which is used in the count-up mode. On the other hand, the pulse generator 31 generates the clock signal CLDN which is used in the count-down mode. Thus, the resistors $R_1, R_2, \ldots R_n$ which determine the oscillation frequency of the pulse generator 31 are preset to values proportional to the constants k of the respective food groups, based on the resistor $R_o$ of the pulse generator 30.

Numeral 39 denotes a power control circuit for the cleaning heater which responds to a signal STA' to produce timing pulses $P_1$ and $P_2$ shown in FIG. 12. Numeral 26 denotes a humidity detection/amplifier circuit which is constructed in accordance with the teaching explained in FIG. 7 and includes the logarithmic amplifier shown in FIG. 9. Numeral 27 denotes a minimum value detection circuit which comprises the maximum value detection circuit shown in FIG. 7 and a level shifting circuit. The circuit 27 is controlled by the control pulse $P_2$ shown in FIG. 12 to start to operate $\tau_d$ time period after the start of heating. This prevents the minimum value detection circuit from operating during the time period $\tau_d$ in which the humidity changes by the cleaning of the sensor. Numeral 29 denotes an amplitude comparator circuit which is equivalent to the circuit 10 shown in FIG. 7. An output signal from the comparator 29 is applied to the line HDET. It will be apparent from the following description that the time required for the line HDET to become "1" level corresponds to the time period $T_D$ in the equations (1), (2) and (3).

The operation of the present embodiment is now explained. The flip-flop 38 and the counter 35 are initially cleared by the signal CLA. This can be readily carried out by a circuit means which automatically generates the signal CLA upon turning on of the power supply. The explanation of such circuit means is omitted here because it does not constitute a part of the present invention. By closing one of the selection switches $S_1, S_2, \ldots S_n$ depending on a particular food to be heated, the pulse generator 31 generates the pulse signal CLDN having a pulse period which is k times as long as the pulse period $\tau$ of the pulse signal CLUP generated by the pulse generator 30.

After the selected switch is closed, a heating start switch is closed. Then, the start signal STA is produced, which sets the flip-flop 38. Thus, the signal STA' assumes "1" state. As a result, the magnetron 4 is powered through the driver circuit 5 so that the magnetron 4 is energized. Then, as described in conjunction with FIGS. 1 and 3, the relative humidity near the humidity sensor initially decreases and then increases as water vapor is generated from the food. This change in the humidity is detected by the humidity sensor 6 and amplified by the amplifier circuit 28. The minimum value holding circuit 27 produces a signal after the humidity signal from the amplifier circuit 28 has passed the minimum value and started to increase. The level of the signal produced by the circuit 27 is lower than the output level of the amplifier circuit 28 by the minimum value. The output signal from the circuit 27 is compared in the comparator fircuit 29 with the reference level H which corresponds to the increment (threshold) Δh of the relative humidity from its minimum value. When the output signal of the minimum value detection circuit 27 exceeds the reference level H, the level comparator 29 produce the detection output HDET. The detection output HDET assumes "0" state until the relative humidity increases by the increment Δh from the minimum value and the inverter circuit 32 produces "1" output during this state. Since the signal OUT is "1", the gate circuit 34 gates the count pulses CLUP as the count-up input UP to the up/down counter 35 which sequentially counts up a train of pulses CLUP. As heating continues, the relative humidity passes its minimum value and increases by the increment Δh from the minimum value, at which time the output HDET assumes "1" state and the inverter circuit 17 produces "0" output. As a result, the gate 18 is closed to block the count-up input signal UP. At the same time, the gate circuit 33 is opened to gate the count-down input signal DN to the counter 35.

Thus, the content of the counter 35 counted up until the detection output is produced is now counted down by a train of pulses CLDN. The period of the pulse train CLDN has been determined by the selection switch as described above. The content of the counter 35 is applied to the decoder 36 to check whether the content is zero, that is, the bit outputs of the counter are all "0". In this manner, as the content of the counter counted up for the time period $T_D$ is counted down after the time period $T_D$, the content of the counter will reach zero when the time period $T_R$ determined by the period of the pulse train CLDN has elapsed. At this moment, the decoder 36 produces "1" output on the line ZERO. On the other hand, since the output HDET assumes "1" state after the time period $T_D$, the AND circuit 37 is met to reset the flip-flop 38. Thus, the signal OUT is reset to "0". As a result, the magnetron 4 is deenergized through the driver circuit 5 so that the heating is stopped.

As described hereinabove, according to the present invention, proper heating is attained by merely selecting a constant k depending on a group of particular food to be cooked or a type of cooking required. For certain foods, proper heating can be attained without selection of the constant k. Accordingly, setting of the quantity of food in addition to the selection of the group of food or type of cooking, as required in the prior art microwave oven, is no longer necessary. Furthermore, since the total heating time is obtained by detecting a significant change in the cooking condition of the food and the heating time required for such significant change to take place is related to the quantity of the food in order to determine additional heating time required, the correction of heating time, which would otherwise be required due to the variation of the initial temperature of the food, is not required. It is only necessary to select the group of food or type of cooking within which the same constant k is used to determine the additional time period after the detection of the significant change of condition. Therefore, the operation is easier than in the prior art microwave oven and more proper heating and cooking can be attained. Moreover, since the heating time need not be corrected depending on the output power of the microwave oven, it is not necessary to provide different timers for different output power microwave ovens. This contributes to rationalize the production line.

The above advantages when combined with the logarithmic characteristic of the humidity detection/amplifier, the cleaning heater for the humidity sensor and the control circuit therefor, materially increases the field of application as the heating and cooking apparatus and the reliability thereof.

We claim:

1. A heating control apparatus comprising:
   heating means for heating food;
   humidity sensor means for detecting relative humidity, said relative humidity having a minimum value and changing with the amount of water vapor emanating from said food as said food is heated;
   humidity change detecting means connected to said humidity sensor means for detecting when an abrupt rise occurs in the value of relative humidity with respect to said minimum relative humidity value, the output of said humidity change detecting means being substantially unaffected by changes in the surrounding temperature and humidity conditions, said humidity change detecting means detecting when said relative humidity has risen by a predetermined threshold value from said minimum relative humidity value, said humidity change detecting means including,
   an amplifier circuit for amplifying the output signal of said humidity sensor,
   a minimum value detector circuit for holding the minimum value of the output signal of said amplifier circuit and providing a difference signal corresponding to the difference between the output of said amplifier cirucit and said minimum value, and
   a comparator circuit for comparing said difference signal with said predetermined threshold value, said comparator circuit providing a signal when said difference signal reaches said predetermined threshold value; and
   heating time determining means connected to said humidity change detecting means for determining the total heating time including an additional heating time which commences after said humidity change detecting means detects that the change in the relative humidity has reached the predetermined threshold value.

2. A heating control circuit according to claim 1, further comprising means for maintaining the performance of said humidity sensor means, said further means including a heater arranged adjacent to said humidity sensor means and a heater power control circuit for controllably energizing said heater whereby said humidity sensor means is heated for a predetermined time period, and means for maintaining the periphery of said humidity sensor means in a vented condition.

3. A heating control apparatus according to claim 2, wherein said heater power control circuit controls power by changing the phase of the applied voltage to the heater and the application time period.

4. A heating control apparatus according to claim 2, wherein said heater power control circuit controls power by changing the amplitude of the applied voltage to the heater and the application time period.

5. A heating control apparatus according to claim 1, wherein said heating time determining means include a counter circuit for counting up a first time period with a first clock signal for the start of heating until the predetermined threshold value is reached, and for counting down after the first time period with a second clock signal to obtain said additional heating time, said second clock signal having a clock period depending on the type of food to be cooked.

6. A heating control apparatus according to claim 1, wherein said amplifier circuit includes a logarithmic amplifier for converting the output signal of said humidity sensor into a logarithmically changing signal thereby preventing an error in the time at which said predetermined threshold value is reached.

7. A heating control apparatus according to claim 6, wherein said logarithmic amplifier comprises:
an inverting high gain amplifier,
an input resistor connected to an input of said high gain amplifier, and
a feedback circuit coupled between the input and output of said amplifier, said feedback circuit comprising a segmental curve approximating circuit including a plurality of parallel connected series circuits each having a resistor and a diode.

8. A heating control apparatus according to claim 1, wherein said minimum value holding circuit comprises:
a filtering circuit receiving the output signal from said amplifier for smoothing said output signal,
a level shifting circuit for shifting up the filtered output of said filtering circuit to a positive level, and
a maximum value holding circuit for receiving the shifted voltage from said level shifting circuit to hold a maximum value of said shifted voltage thereby producing a voltage output which is smaller than said shifted voltage by said maximum value.

9. A heating control apparatus comprising:
heating means for heating food;
vapor sensor means for detecting the amount of vapor, said amount of vapor having a minimum value and changing with the amount of vapor emanating from said food as said food is heated,
vapor change detecting means connected to said vapor sensor means for detecting when an increase occurs in the amount of vapor with respect to said minimum amount of vapor, the output of said vapor change detecting means being substantially unaffected by changes in the surrounding temperature and vapor conditions, said vapor change detecting means detecting when a relation between an increasing amount of vapor and said minimum amount of vapor has reached a predetermined reference, said vapor change detecting means including,
an amplifier circuit for amplifying the output signal of said vapor sensor,
a minimum value detector circuit for holding the minimum value of the output signal of said amplifier circuit and providing a signal corresponding to the relation between the output of said amplifier circuit and said minimum value, and
a comparator circuit for comparing said signal with said predetermined reference value, said comparator circuit providing a signal when said signal reaches said predetermined reference value; and
heating time determining means connected to said vapor change detecting means for determining the total heating time including an additional heating time which commences after said vapor change detecting means detects that the change in the amount of vapor has reached the predetermined reference value.

10. A heating control apparatus according to claim 9, wherein said relation between said increasing amount of vapor and said minimum amount of vapor is the difference therebetween, said difference corresponding to a predetermined threshold value.

11. A heating control apparatus according to claim 9 wherein said relation between said increasing amount of vapor and said minimum amount of vapor is a ratio therebetween.

* * * * *